US009736024B2

(12) United States Patent
Wood

(10) Patent No.: US 9,736,024 B2
(45) Date of Patent: Aug. 15, 2017

(54) REGISTERING DEVICES FOR NETWORK ACCESS

(75) Inventor: Brian O. Wood, Eagan, MN (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 13/027,422

(22) Filed: Feb. 15, 2011

(65) Prior Publication Data

US 2012/0210000 A1 Aug. 16, 2012

(51) Int. Cl.
G06F 15/173 (2006.01)
H04L 12/24 (2006.01)

(52) U.S. Cl.
CPC .......... H04L 41/0853 (2013.01); H04L 41/12 (2013.01)

(58) Field of Classification Search
CPC ..... H04L 67/18; H04L 63/0876; H04L 63/10; H04L 63/101; H04L 45/74; H04L 45/745; H04L 65/1073; H04L 29/12018; H04L 61/10; H04L 63/08
USPC ................................. 709/224, 225, 229, 119
See application file for complete search history.

(56) References Cited

U.S. PATENT DOCUMENTS

| 8,406,227 B2* | 3/2013 | Lee ..................... H04L 12/4011 370/352 |
| 2005/0055570 A1* | 3/2005 | Kwan ..................... H04L 63/08 726/4 |
| 2005/0086389 A1* | 4/2005 | Chang ........................... 709/250 |
| 2005/0197965 A1* | 9/2005 | Takabayashi et al. .......... 705/59 |
| 2006/0020414 A1* | 1/2006 | Jiang ............................ 702/122 |
| 2006/0031436 A1* | 2/2006 | Sakata et al. ................. 709/221 |
| 2006/0089987 A1* | 4/2006 | Igarashi ............ H04L 29/12783 709/225 |
| 2009/0307019 A1* | 12/2009 | Grussu ............................. 705/5 |
| 2010/0325615 A1* | 12/2010 | Ramot ......................... 717/124 |
| 2012/0076072 A1* | 3/2012 | Jalfon .................. H04W 12/02 370/328 |

* cited by examiner

Primary Examiner — SM Rahman
(74) Attorney, Agent, or Firm — Roy W. Truelson; James R. Nock; Biggers Kennedy Lenart Spraggins LLP

(57) ABSTRACT

Methods, systems, and computer program products are disclosed for registering devices for network access. Embodiments include receiving, by a registration module, a media access control (MAC) address associated with a network adapter of a device; registering, by the registration module, the device, including associating the MAC address with a guest account at or before the time of registration of a guest; and allowing, by the registration module, the registered device to access a network.

14 Claims, 8 Drawing Sheets

REGISTERING DEVICES FOR NETWORK ACCESS

BACKGROUND OF THE INVENTION

Field of the Invention

The field of the invention is data processing, or, more specifically, methods, systems, and computer program products for registering devices for network access.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Paying for internet access at hotels is more and more common worldwide. To charge it to your room, you commonly have to go to track down the front office and get a unique user id/password—or encounter a laborious registration routing at logon time in your hotel room.

SUMMARY OF THE INVENTION

Methods, systems, and computer program products are disclosed for registering devices for network access. Embodiments include receiving, by a registration module, a media access control (MAC) address associated with a network adapter of a device; registering, by the registration module, the device, including associating the MAC address with a guest account at or before the time of registration of a guest; and allowing, by the registration module, the registered device to access a network.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
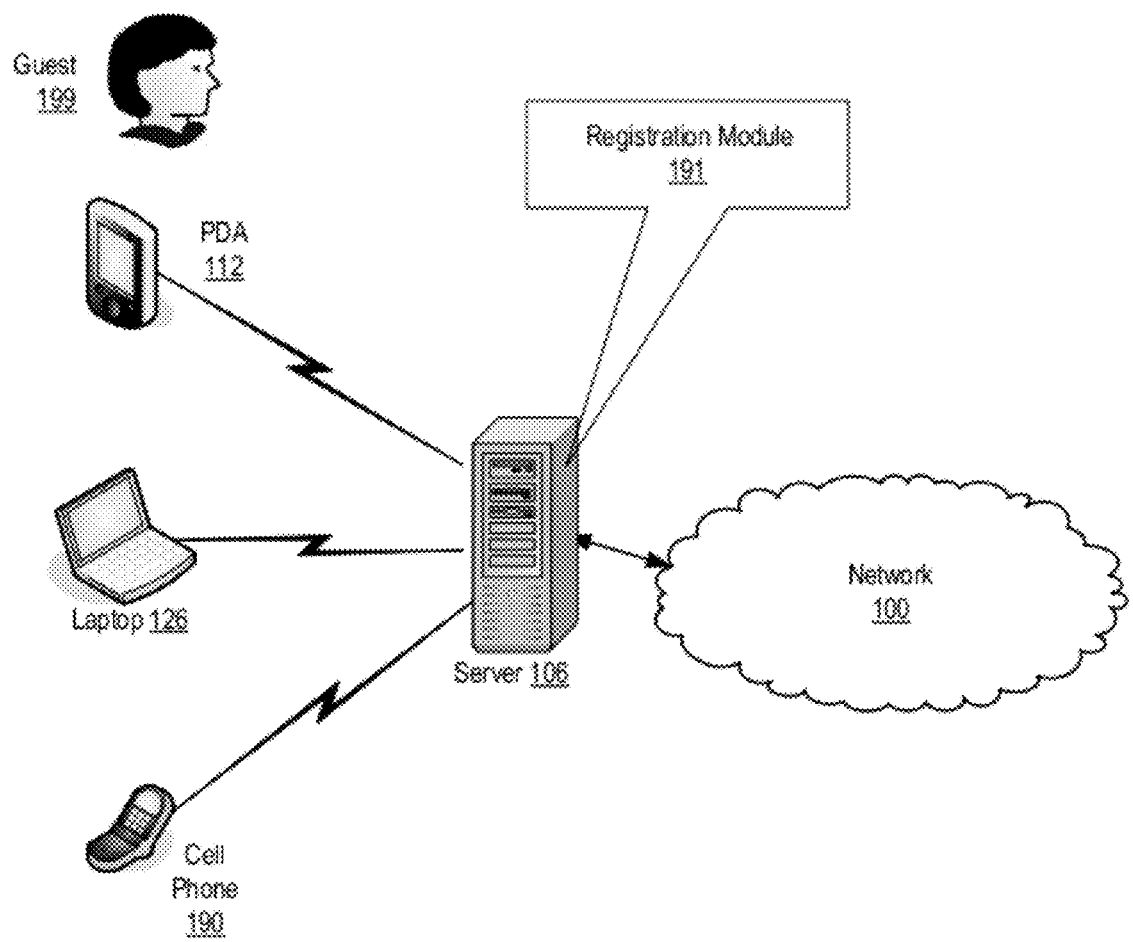
FIG. 1 sets forth a network diagram of a system for registering devices for network access according to embodiments of the present invention.

Examples of methods, systems, and products for registering devices for network access in accordance with the present invention are described with reference to the accompanying drawings, beginning with FIG. 1. FIG. 1 sets forth a network diagram of a system for registering devices for network access according to embodiments of the present invention. The system of FIG. 1 includes a server (106) with a registration module (191).

The registration module (191) of FIG. 1 is configured to determine which devices of associated with a guest (199) may access a network (100). In the example of FIG. 1, the guest (199) has a personal digital assistant (PDA) (112), a laptop (126), and a cell phone (190). Each guest device includes one or more network adapters to provide wireless or wired network capabilities for connecting to a network. A network adapter includes a media access control (MAC) address that is specific to the hardware of the network adapter, such that each MAC address is unique.

The registration module (191) of FIG. 1 is configured to receive a media access control (MAC) address associated with a network adapter of a device; register the device, including associate the MAC address with a guest account at or before the time of registration of a guest; and allow the registered device to access a network. By having a registration module that can register and associate multiple devices with a guest account, the guest (199) may use multiple devices to access the network (100).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Registering devices for network access in accordance with the present invention is generally implemented with computers, that is, with automated computing machinery. In the system of FIG. 1, for example, the guest registration module (191) is implemented to some extent at least as computers. For further explanation, therefore, FIG. 2 sets forth a block diagram of automated computing machinery comprising an exemplary computer (152) useful in registering devices for network access according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is the guest registration module (191) that includes computer program instructions that when executed by the computer processor (156) cause the computer (152) to carry out the steps of: receive a media access control (MAC) address (198) associated with a network adapter of a device (102); register the device (102), including associate the MAC address with a guest account at or before the time of registration of a guest; and allow the registered device to access the network (100).

Also stored in RAM (168) is an operating system (154). An operating system is a computer software component that is responsible for execution of applications programs and for administration of access to computer resources, memory, processor time, and I/O functions, on behalf of application programs. Operating systems useful registering devices for network access according to embodiments of the present invention include UNIX™, Linux™, Microsoft XP™, AIX™, IBM's i5/OS™, and others as will occur to those of skill in the art. The operating system (154) and the guest registration module (191) in the example of FIG. 2 are shown in RAM (168), but many components of such software typically are stored in non-volatile memory also, such as, for example, on a disk drive (170).

Figure 2:
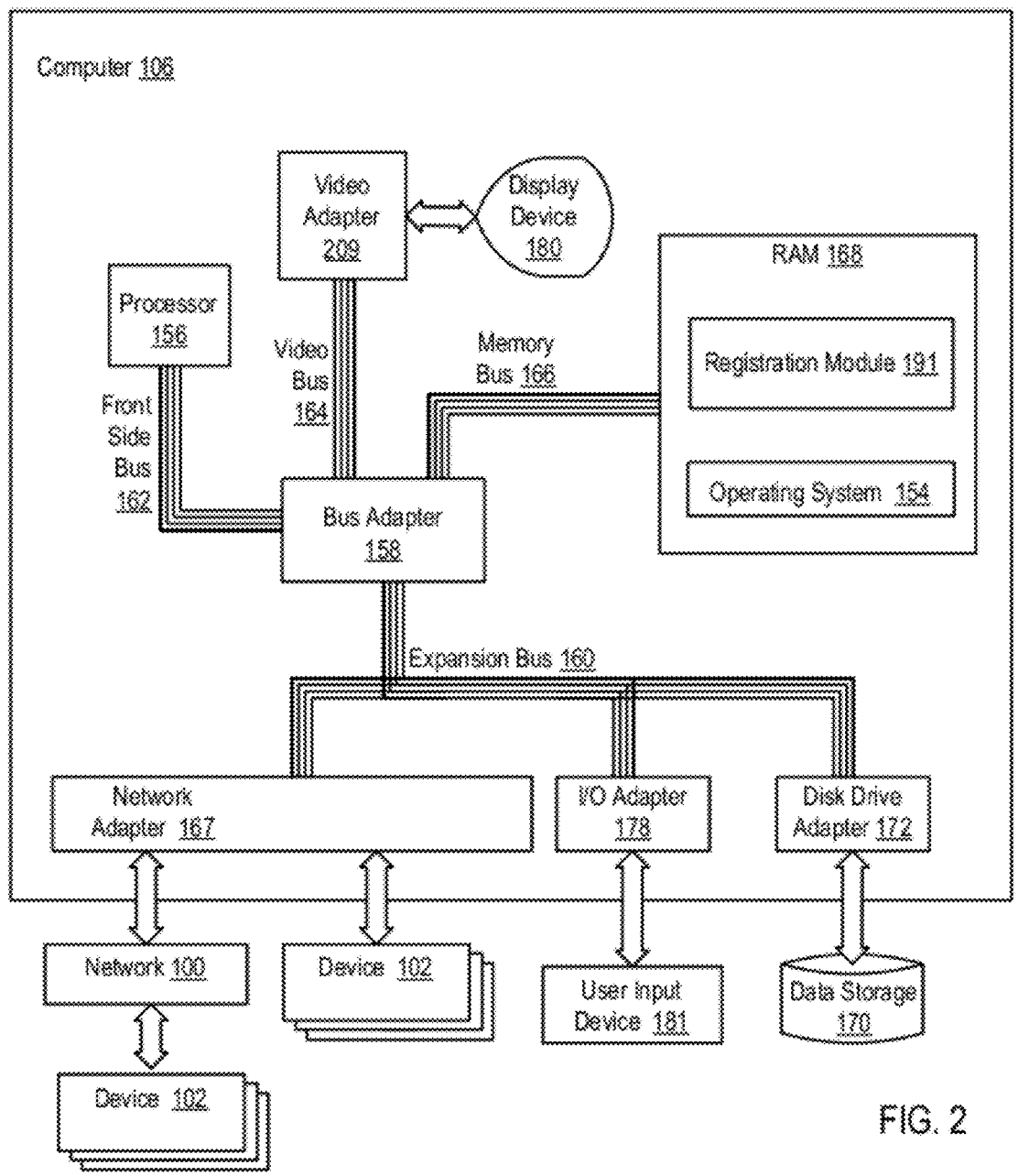
FIG. 2 sets forth a block diagram of automated computing machinery comprising an exemplary computer useful in registering devices for network access according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for registering devices for network access according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a network adapter (167) for data communications with devices (102) and for data communications with a data communications network (100). The devices (102) of FIG. 2 may be any electronic device, such as the PDA (112), the laptop (126), and the cell phone (190) of FIG. 1. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for registering devices for network access according to embodiments of the present invention include modems for wired dial-up communications, Ethernet (IEEE 802.3) adapters for wired data communications network communications, and 802.11 adapters for wireless data communications network communications.

Figure 3:
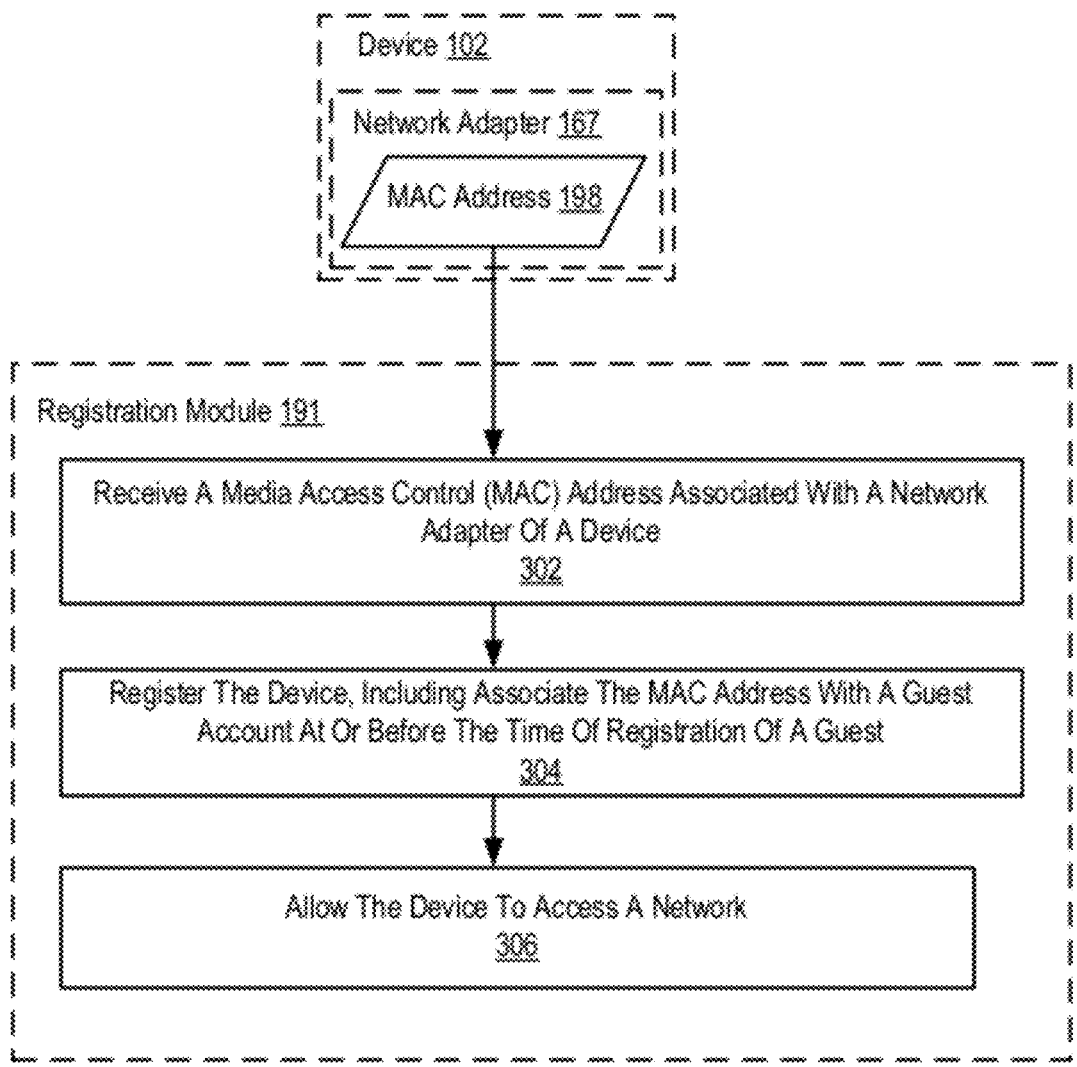
FIG. 3 sets forth a flow chart illustrating an example of a method for registering devices for network access according to embodiments of the present invention.

For further explanation, FIG. 3 sets forth a flow chart illustrating an example of a method for registering devices for network access according to embodiments of the present invention. The method of FIG. 3 includes receiving (302), by the registration module (191), a media access control (MAC) address (198) associated with a network adapter (167) of a device (102). Receiving (302) a media access control (MAC) address (198) associated with a network adapter (167) of a device (102) may be carried out by a user entering the MAC address (198) by a user input device; or querying the device (102) for the MAC address (198).

The method of FIG. 3 includes registering (304), by the registration module (191), the device (102), including associating the MAC address (198) with a guest account at or before the time of registration of a guest. Registering (304) the device (102), including associating the MAC address (198) with a guest account at or before the time of registration of a guest may be carried out by receiving a confirmation from a user that the MAC address (198) is associated with a guest account; or querying the device (102) for a user name; comparing the user name with guest account records.

The method of FIG. 3 also includes allowing (306), by the guest registration module (191), the registered device (102) to access a network (100). Allowing (306) the registered device (102) to access the network may be carried out by modifying permissions within one or more devices on the network (100).

Figure 4:
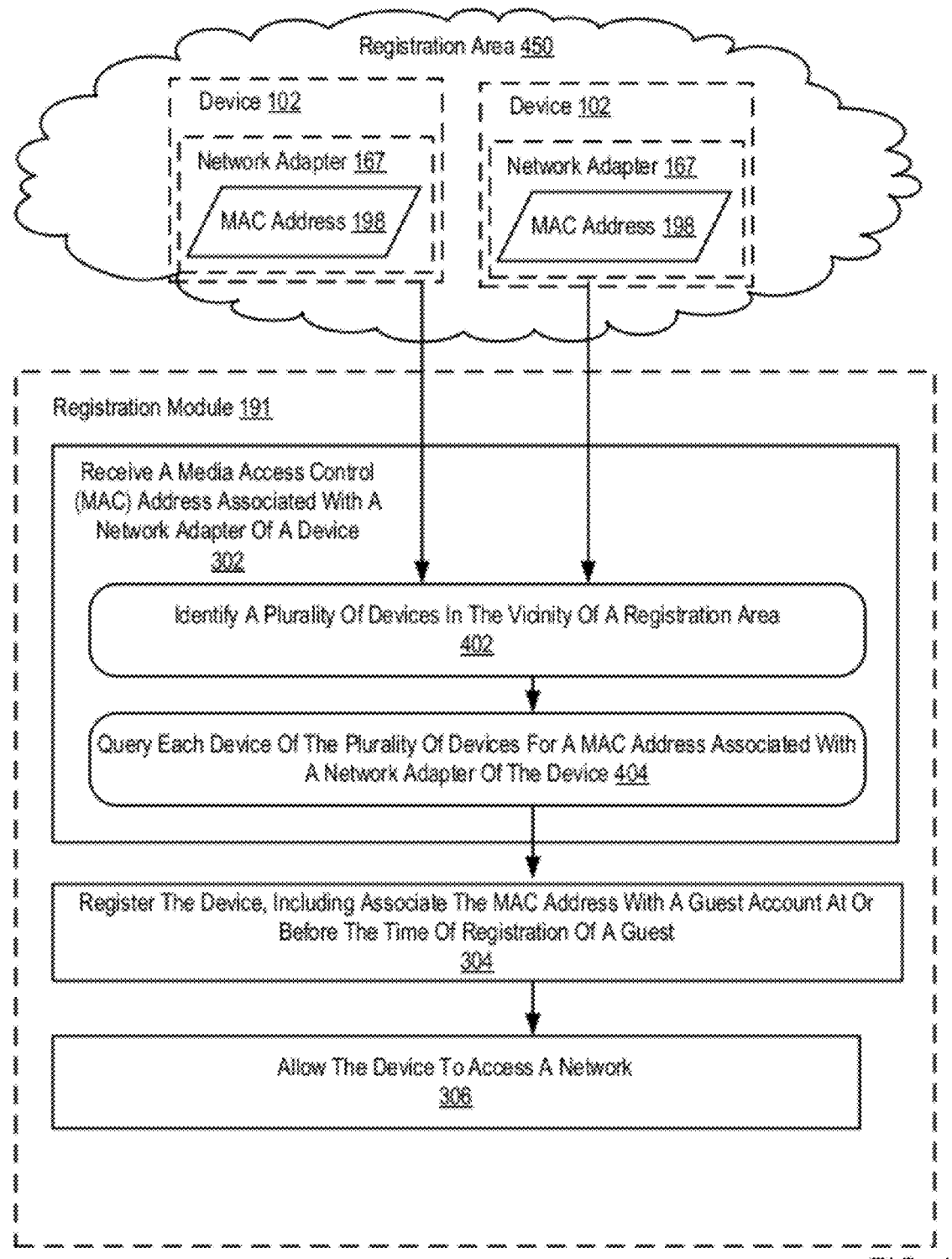
FIG. 4 sets forth a flow chart illustrating another example of a method for registering devices for network access according to embodiments of the present invention.

For further explanation, FIG. 4 sets forth a flow chart illustrating another example of a method for registering devices for network access according to embodiments of the present invention. The method of FIG. 4 includes the following elements of the method of FIG. 3: receiving (302), by the registration module (191), a media access control (MAC) address (198) associated with a network adapter (167) of a device (102); registering (304), by the registration module (191), the device (102), including associating the MAC address (198) with a guest account at or before the time of registration of a guest; and allowing (306), by the guest registration module (191), the registered device (102) to access a network (100).

The elements of FIG. 4 that differ from the method of FIG. 3 include: identifying (402), by the registration module (191), a plurality of devices in the vicinity of a registration area; and querying (404), by the registration module (191), each device of the plurality of devices for a MAC address associated with the network adapter (167) of the device (102).

In the example of FIG. 4, however, receiving (302) a media access control (MAC) address (198) associated with a network adapter (167) of a device (102) includes identifying (402), by the registration module (191), a plurality of devices in the vicinity of a registration area (450). Identifying (402) a plurality of devices in the vicinity of the registration area (450) may be carried out by establishing the registration area (450) using one or more network devices or proximity sensors; and detecting devices near the vicinity of the proximity sensors.

In the example of FIG. 4, however, receiving (302) a media access control (MAC) address (198) associated with a network adapter (167) of a device (102) includes querying (404), by the registration module (191), each device of the plurality of devices for a MAC address associated with the network adapter (167) of the device (102). Querying (404) each device of the plurality of devices for a MAC address associated with the network adapter (167) of the device (102) may be carried out by transmitting to each of the devices, a request for a MAC address.

Figure 5:
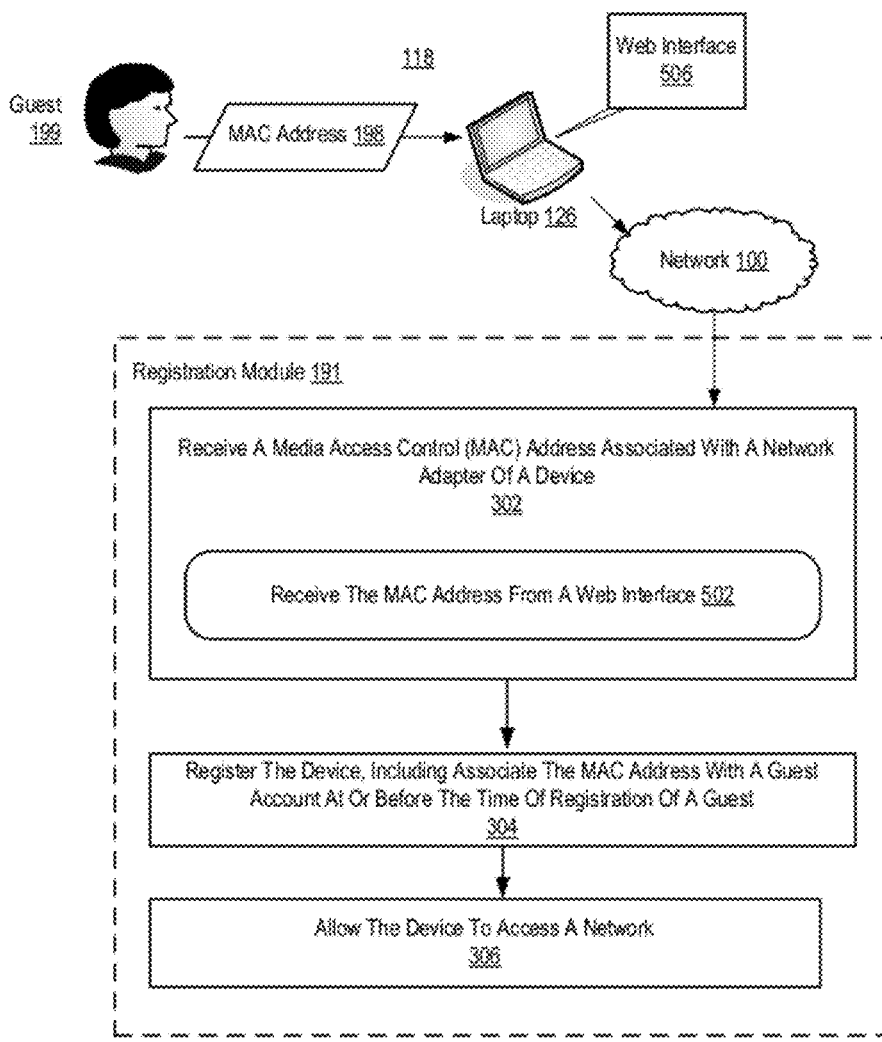
FIG. 5 sets forth a flow chart illustrating another example of a method for registering devices for network access according to embodiments of the present invention.

For further explanation, FIG. 5 sets forth a flow chart illustrating another example of a method for registering devices for network access according to embodiments of the present invention. The method of FIG. 5 includes the following elements of the method of FIG. 3: receiving (302), by the registration module (191), a media access control (MAC) address (198) associated with a network adapter (167) of a device (102); registering (304), by the registration module (191), the device (102), including associating the MAC address (198) with a guest account at or before the time of registration of a guest; and allowing (306), by the guest registration module (191), the registered device (102) to access a network (100).

The elements of FIG. 5 that differ from the method of FIG. 3 include receiving (502), by the registration module (191), the MAC address (198) from a web interface (506). In the method of FIG. 5, receiving (302) a media access control (MAC) address (198) associated with a network adapter (167) of a device (102) includes receiving (502), by the registration module (191), the MAC address (198) from a web interface (506). Receiving (502) the MAC address (198) from a web interface (506) may be carried out by a user (199) access a website on a laptop (126). The website may include a web interface (506) that enables the guest (199) to perform an online registration process. The registration module (191) may use the web interface (506) to access the laptop (126) and retrieve the MAC address (198) of the laptop (126). Alternatively, the web interface (506) may ask the guest (199) to enter the MAC address of a device the guest (199) wishes to register and the web interface (506) provides the entered MAC address (198) to the registration module (191).

Figure 6:
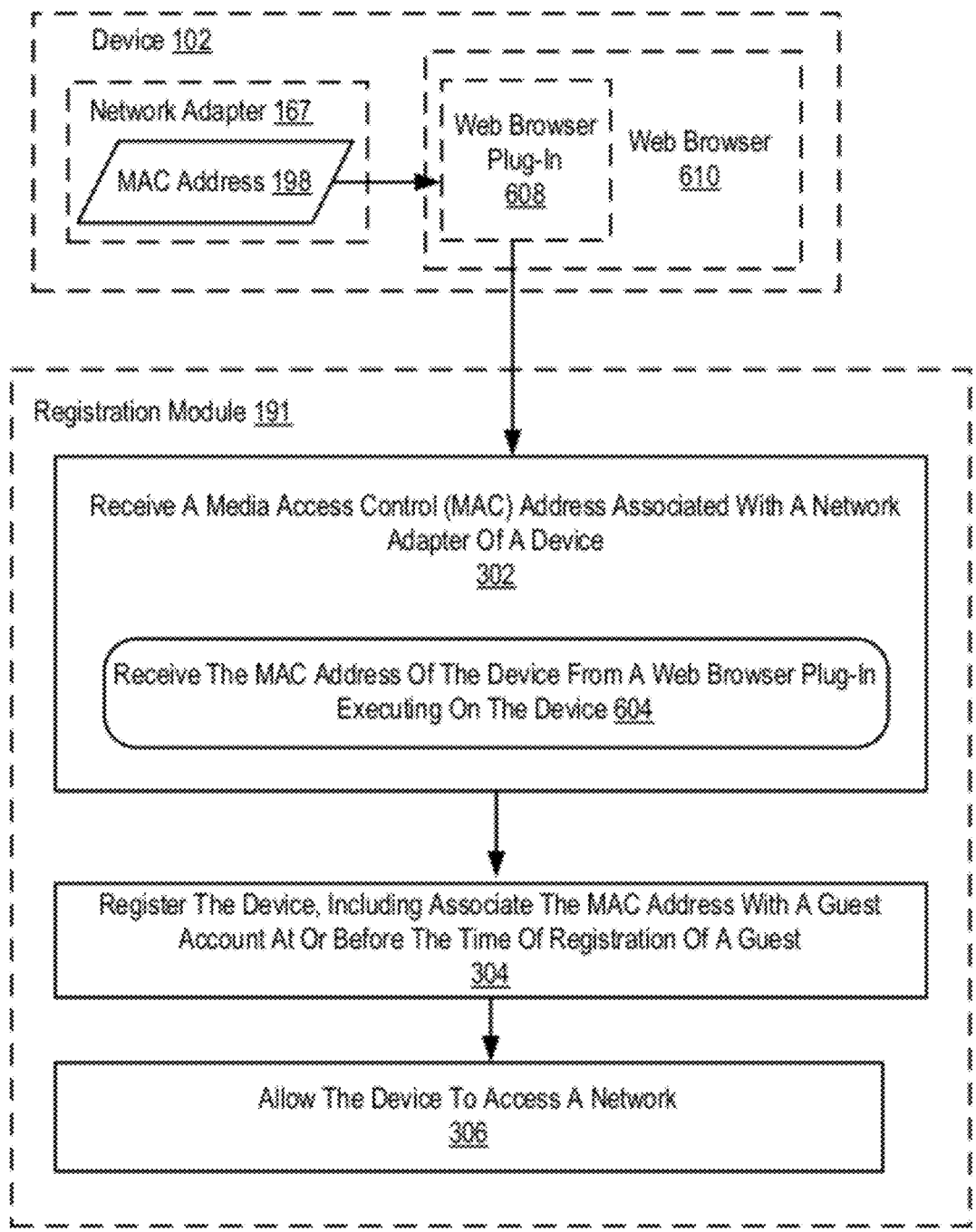
FIG. 6 sets forth a flow chart illustrating another example of a method for registering devices for network access according to embodiments of the present invention.

For further explanation, FIG. 6 sets forth a flow chart illustrating another example of a method for registering devices for network access according to embodiments of the present invention. The method of FIG. 6 includes the following elements of the method of FIG. 3: receiving (302), by the registration module (191), a media access control (MAC) address (198) associated with a network adapter (167) of a device (102); registering (304), by the registration module (191), the device (102), including associating the MAC address (198) with a guest account at or before the time of registration of a guest; and allowing (306), by the guest registration module (191), the registered device (102) to access a network (100).

The elements of FIG. 6 that differ from the method of FIG. 3 include receiving (604), by the registration module (191), the MAC address (198) of the device (102) from a web browser plug-in (608) executing on the device (102). In the method of FIG. 6, receiving (302) a media access control (MAC) address (198) associated with a network adapter (167) of a device (102) includes receiving (604), by the registration module (191), the MAC address (198) of the device (102) from a web browser plug-in (608) executing on the device (102). Receiving (604) the MAC address (198) of the device (102) from a web browser plug-in (608) executing on the device (102) may be carried out by the web browser plug-in (608) of a web browser application (610) determining the MAC address (198) of the network adapter (167) of the device (102) and transmitting the MAC address (198) to the registration module (191) over a communication connection, such as a wireless network connection, an Ethernet connection, a Bluetooth connection, and so on. For example, the MAC address is received from the web browser plug-in (608) when the web browser (610) is used on the device (102) to complete an online guest registration process.

Figure 7:
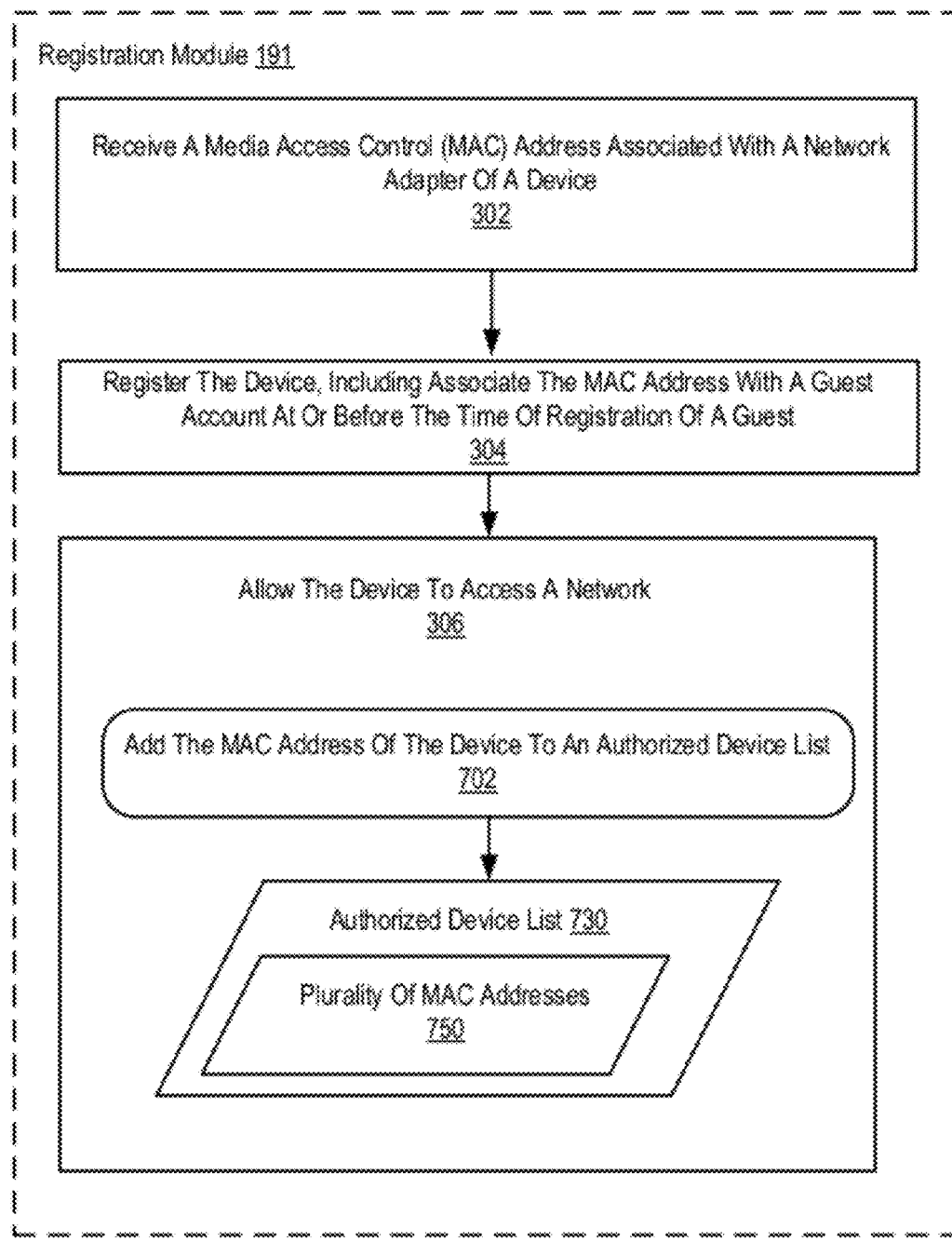
FIG. 7 sets forth a flow chart illustrating another example of a method for registering devices for network access according to embodiments of the present invention.

For further explanation, FIG. 7 sets forth a flow chart illustrating another example of a method for registering devices for network access according to embodiments of the present invention. The method of FIG. 7 includes the following elements of the method of FIG. 3: receiving (302), by the registration module (191), a media access control (MAC) address (198) associated with a network adapter (167) of a device (102); registering (304), by the registration module (191), the device (102), including associating the MAC address (198) with a guest account at or before the time of registration of a guest; and allowing (306), by the guest registration module (191), the registered device (102) to access a network (100).

The elements of FIG. 7 that differ from the method of FIG. 3 include adding (702), by the registration module (191), the MAC address (198) of the device (102) to an authorized device list (730). In the method of FIG. 7, allowing (306) the device (102) to access the network (100) includes adding (702), by the registration module (191), the MAC address (198) of the device (102) to an authorized device list (730). Adding (702) the MAC address (198) of the device (102) to an authorized device list (730) may be carried out by storing the MAC address (198) in the authorized device list (730); receiving a network connection request from a device; determining the MAC address of the requesting device; querying the authorized device list (730) with the MAC address of the requesting device; and enabling the requesting device to access the network (100) if the MAC address of the requesting device is stored in the authorized device list (730).

Figure 8:
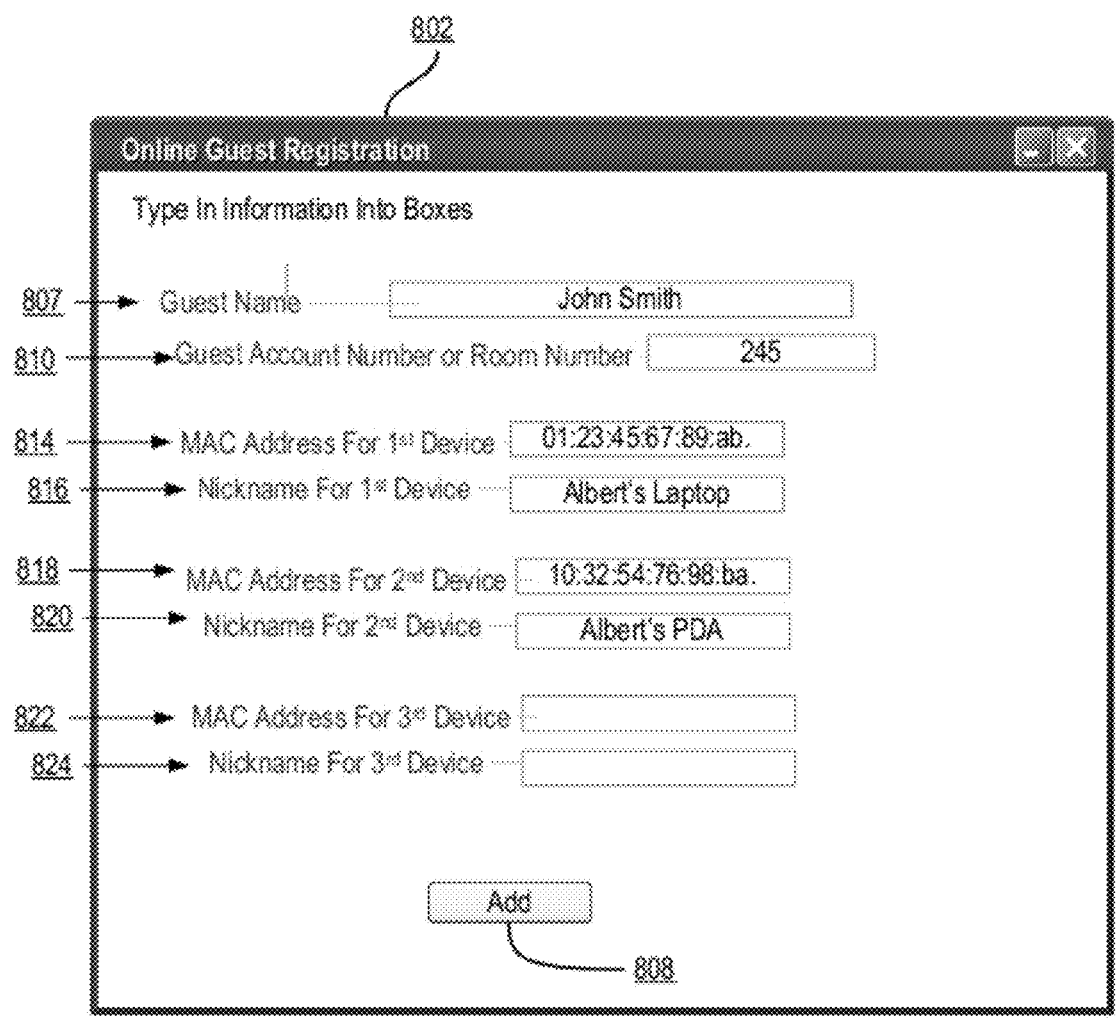
FIG. 8 sets forth a graphical user interface for registering devices for network access according to embodiments of the present invention.

For further explanation, FIG. 8 sets forth a graphical user interface (GUI) (802) for registering devices for network access according to embodiments of the present invention. The GUI (802) of FIG. 8 includes boxes for entering information during an online registration process. The information may be entered by an employee or a guest. The boxes include a guest name box (807), a guest account number or room number box (810), a MAC address for a first device (814), a nickname for the first device box (816), a MAC address for a second device (818), a nickname for the second device box (820), a MAC address for a third device (822), and a nickname for the third device box (824). The GUI (802) of FIG. 8 also includes an add button (808). In response to engaging the add button (808), the information entered into the boxes is added to the registration module (191).

As will be appreciated by one skilled in the art, a world wide identifier (WWID) may be used in place of a MAC address in accordance with the invention. Exemplary embodiments of the present invention are described largely in the context of a fully functional computer system for registering devices for network access. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of registering devices for network access, the method comprising; receiving, by a registration module, a media access control (MAC) address associated with a network adapter of a device, the device being associated with a guest of a lodging facility; registering, by the registration module, the device, including associating the MAC address received by said receiving step of the MAC address associated with the network adapter of the device with a guest account for said guest, before the time of registration of a said guest at said lodging facility and by confirming that a user name associated with the device is associated with a said guest account; and allowing, by the registration module, the registered device to access a network at said lodging facility, including adding, by the registration module, the MAC address of the device to an authorized device list, the authorized device list including multiple MAC addresses associated with one guest account, each MAC address corresponding to a different network adapter of one or more devices.

2. The method of claim 1 wherein receiving the MAC address associated with the network adapter of the device includes:
   identifying, by the registration module, a plurality of devices in a registration area; and
   querying, by the registration module, each device of the plurality of devices for a MAC address associated with the network adapter of the device.

3. The method of claim 1 wherein receiving the MAC address associated with the network adapter of the device includes receiving, by the registration module, from the guest the MAC address through a web interface of an on-line guest registration process for registering said guest.

4. The method of claim 3 wherein receiving the MAC address associated with the network adapter of the device includes receiving, by the registration module, from the guest the MAC address through a web browser plug-in executing on the device.

5. The method of claim 1 wherein the network adapter includes wireless network adapters and wired network adapters.

6. A system for registering devices for network access, the system comprising a computer processor, a computer memory operatively coupled to the computer processor, the computer memory having disposed within it computer program instructions that when executed by the computer processor cause the apparatus to carry out the steps of: receiving, by a registration module, a media access control (MAC) address associated with a network adapter of a device, the device being associated with a guest of a lodging facility; registering, by the registration module, the device, including associating the MAC address received by said receiving step of the MAC address associated with the network adapter of the device with a guest account for said guest, before the time of registration of a said guest at said lodging facility and by confirming that a user name associated with the device is associated with a said guest account; and allowing, by the registration module, the registered device to access a network at said lodging facility, including adding, by the registration module, the MAC address of the device to an authorized device list, the authorized device list including multiple MAC addresses associated with one guest account, each MAC address corresponding to a different network adapter of one or more devices.

7. The system of claim 6 wherein receiving the MAC address associated with the network adapter of the device includes:
   identifying, by the registration module, a plurality of devices in a registration area; and
   querying, by the registration module, each device of the plurality of devices for a MAC address associated with the network adapter of the device.

8. The system of claim 6 wherein receiving the MAC address associated with the network adapter of the device includes receiving, by the registration module, from the guest the MAC address through a web interface of an on-line guest registration process for registering said guest.

9. The system of claim 8 wherein receiving the MAC address associated with the network adapter of the device includes receiving, by the registration module, from the guest the MAC address through a web browser plug-in executing on the device.

10. The system of claim 8 wherein the network adapter includes wireless network adapters and wired network adapters.

11. A computer program product, the computer program product comprising: a computer readable storage medium having computer readable program code embodied therewith, wherein the computer readable storage medium is not a signal, the computer readable program code comprising: computer readable code configured to receive, by a registration module, a media access control (MAC) address associated with a network adapter of a device, the device being associated with a guest of a lodging facility; computer readable code configured to register, by the registration module, the device, including associating the MAC address received when receiving the MAC address associated with the network adapter of the device with a guest account for said guest, before the time of registration of a said guest at said lodging facility and by confirming that a user name associated with the device is associated with a said guest account; and computer readable program code configured to allow, by the registration module, the registered device to access a network at said lodging facility, including computer readable program code configured to add, by the registration module, the MAC address of the device to an authorized device list, the authorized device list including multiple MAC addresses associated with one guest account, each MAC address corresponding to a different network adapter of one or more devices.

12. The computer program product of claim 11 wherein the computer readable program code configured to receive the MAC address associated with the network adapter of the device includes:
   computer readable program code configured to identify, by the registration module, a plurality of devices in a registration area; and
   computer readable program code configured to query, by the registration module, each device of the plurality of devices for a MAC address associated with the network adapter of the device.

13. The computer program product of claim 11 wherein the computer readable program code configured to receive the MAC address associated with the network adapter of the device includes computer readable program code configured to receive, by the registration module, from the guest the MAC address through a web interface of an on-line guest registration process for registering said guest.

14. The computer program product of claim 13 wherein the computer readable program code configured to receive the MAC address associated with the network adapter of the device includes computer readable program code configured to receive, by the registration module, from the guest the MAC address through a web browser plug-in executing on the device.

* * * * *